(12) United States Patent
Bang

(10) Patent No.: US 10,962,147 B2
(45) Date of Patent: Mar. 30, 2021

(54) METHODS FOR MANUFACTURING METAL-RESIN COMPOSITE PIPE THAT CAN BE EASILY WOUND INTO RING SHAPE

(71) Applicant: KUMKANG CO., LTD., Jinju-si (KR)

(72) Inventor: Manhyuk Bang, Jinju-si (KR)

(73) Assignee: KUMKANG CO., LTD., Jinju-si (KR)

(*) Notice: Subject to any disclaimer, the term of this patent is extended or adjusted under 35 U.S.C. 154(b) by 100 days.

(21) Appl. No.: 16/109,741

(22) Filed: Aug. 23, 2018

(65) Prior Publication Data
US 2018/0363809 A1 Dec. 20, 2018

Related U.S. Application Data

(60) Continuation of application No. 15/727,167, filed on Oct. 6, 2017, which is a division of application No.
(Continued)

(30) Foreign Application Priority Data

Apr. 23, 2012 (KR) .................... 10-2012-0042189

(51) Int. Cl.
*B23K 31/00* (2006.01)
*F16L 9/147* (2006.01)
(Continued)

(52) U.S. Cl.
CPC .............. *F16L 9/147* (2013.01); *B05D 1/265* (2013.01); *B05D 7/146* (2013.01); *B23K 31/027* (2013.01);
(Continued)

(58) Field of Classification Search
CPC ...... F16L 9/147; B29C 48/2883; B29C 48/09; B29C 48/21; B29C 48/92; B29C 48/151;
(Continued)

(56) References Cited

U.S. PATENT DOCUMENTS 3,348,995 A * 10/1967 Baker ..................... B32B 15/08
428/215
3,606,635 A 9/1971 Benteler et al.
(Continued)

FOREIGN PATENT DOCUMENTS

DE 9412550 U1 * 10/1994 ............. B29C 48/40
DE 10309908 A1 9/2004
(Continued)

OTHER PUBLICATIONS

European Office Action issued in European Patent Application No. 12875431.4 dated Apr. 10, 2017.
(Continued)

*Primary Examiner* — Kiley S Stoner
(74) *Attorney, Agent, or Firm* — Cantor Colburn LLP

(57) ABSTRACT

The present invention may manufacture a composite pipe by forming an adhesive layer and a resin layer on an outer surface of a metal pipe, and although the composite pipe is wound in a ring shape after the composite pipe is manufactured, a circular cross sectional shape may be maintained without deformation, and after the composite pipe is straightened for the purpose of construction, separation or buckling may be prevented, resulting in excellent transportability and constructability of a product.

11 Claims, 8 Drawing Sheets

Related U.S. Application Data

14/396,363, filed as application No. PCT/KR2012/007863 on Sep. 27, 2012, now abandoned.

(51) Int. Cl.

| | | |
|---|---|---|
| *B29C 48/09* | (2019.01) | |
| *B29C 48/21* | (2019.01) | |
| *B29C 48/92* | (2019.01) | |
| *B29C 48/151* | (2019.01) | |
| *B05D 7/14* | (2006.01) | |
| *B29C 48/285* | (2019.01) | |
| *B23K 31/02* | (2006.01) | |
| *B05D 1/26* | (2006.01) | |
| *B29L 23/00* | (2006.01) | |
| *B05D 7/00* | (2006.01) | |
| *B29C 48/28* | (2019.01) | |
| *B23K 101/04* | (2006.01) | |

(52) U.S. Cl.
CPC ............ *B29C 48/09* (2019.02); *B29C 48/151* (2019.02); *B29C 48/21* (2019.02); *B29C 48/2883* (2019.02); *B29C 48/92* (2019.02); *B05D 7/54* (2013.01); *B23K 2101/04* (2018.08); *B29C 48/28* (2019.02); *B29C 2948/92152* (2019.02); *B29C 2948/92447* (2019.02); *B29C 2948/92647* (2019.02); *B29C 2948/92904* (2019.02); *B29L 2023/22* (2013.01)

(58) Field of Classification Search
CPC .......... B29C 48/28; B29C 2948/92152; B29C 2948/92447; B29C 2948/92647; B29C 2948/92904; B05D 7/146; B05D 1/265; B05D 7/54; B29L 2023/22; B23K 9/0253; B23K 9/028–0288; B23K 11/062; B23K 11/0873; B23K 11/0935; B23K 13/025; B23K 13/046; B23K 26/262; B23K 26/282; B23K 31/027; B23K 2101/04–10
USPC .......... 228/175–176, 144–152, 173.2–173.3, 228/173.6, 17.5–17.7
See application file for complete search history.

(56) References Cited

U.S. PATENT DOCUMENTS

| | | | | |
|---|---|---|---|---|
| 3,635,615 | A | | 1/1972 | Hartmann et al. |
| 3,727,673 | A | * | 4/1973 | Gallucci ............ B22D 11/1281 164/442 |
| 3,815,640 | A | * | 6/1974 | Iida ........................ A01G 9/122 138/146 |
| 3,834,009 | A | * | 9/1974 | Iida ...................... B29C 48/151 29/527.4 |
| 3,941,087 | A | * | 3/1976 | Yazaki ...................... B05B 7/16 118/306 |
| 3,999,029 | A | * | 12/1976 | Orr, Jr. ............... B23K 11/0046 219/107 |
| 4,042,227 | A | * | 8/1977 | Niehaus ................. C21D 1/667 266/93 |
| 4,077,098 | A | * | 3/1978 | Ayusawa .................. B05D 7/14 29/33 J |
| 4,213,486 | A | * | 7/1980 | Samour ................... F16L 58/16 138/143 |
| 4,216,802 | A | | 8/1980 | Bonnes et al. |
| 4,366,972 | A | * | 1/1983 | Franklin ............... B29C 63/048 285/55 |
| 4,606,953 | A | | 8/1986 | Suzuki et al. |
| 4,660,754 | A | * | 4/1987 | Byrd ................... B21C 37/0822 228/151 |
| 4,685,985 | A | * | 8/1987 | Stueke ................... B05D 7/148 156/185 |
| 4,990,383 | A | | 2/1991 | Bergstrom et al. |
| 4,999,903 | A | * | 3/1991 | Bujes ...................... F16L 9/147 29/469.5 |
| 5,851,289 | A | | 12/1998 | Sato et al. |
| 6,030,672 | A | | 2/2000 | Usui |
| 6,412,521 | B1 | | 7/2002 | Sausner et al. |
| 6,589,617 | B2 | | 7/2003 | Hsich et al. |
| 2002/0005223 | A1 | * | 1/2002 | Campagna ............... F16L 9/147 138/146 |
| 2003/0047587 | A1 | * | 3/2003 | Aono ....................... C21D 9/50 228/112.1 |
| 2003/0157286 | A1 | * | 8/2003 | Hesse ...................... C08J 9/122 428/36.5 |
| 2003/0178082 | A1 | | 9/2003 | Yamaguchi et al. |
| 2005/0103757 | A1 | * | 5/2005 | Gysi .................... B23K 37/047 219/121.64 |
| 2009/0093591 | A1 | | 4/2009 | Lyons et al. |
| 2009/0139661 | A1 | * | 6/2009 | Frimel .................. B32B 27/304 156/498 |
| 2009/0165944 | A1 | * | 7/2009 | Steele .................... B05D 7/146 156/283 |
| 2010/0221473 | A1 | * | 9/2010 | Biris ........................ B32B 1/08 428/35.9 |
| 2017/0144343 | A1 | * | 5/2017 | Recher .............. B29C 45/14614 |

FOREIGN PATENT DOCUMENTS

| | | | |
|---|---|---|---|
| DE | 102005061191 A1 | 7/2007 | |
| EP | 1859926 A1 | 11/2007 | |
| GB | 2325420 A | 11/1998 | |
| GB | 2431974 A | 5/2007 | |
| JP | 56030821 A | * 3/1981 | |
| JP | 56139180 A | * 10/1981 | |
| JP | 61028477 A | * 2/1986 | ............ B29C 35/16 |
| JP | 03099718 A | * 4/1991 | |
| JP | 6-304987 A | 11/1994 | |
| JP | H06-344443 A | 12/1994 | |
| JP | H07-108581 A | 4/1995 | |
| JP | 7-156241 A | 6/1995 | |
| JP | H09-201903 A | 8/1997 | |
| JP | 2002-172692 A | 6/2002 | |
| JP | 2005-178031 A | 7/2005 | |
| KR | 10-0667174 B1 | 1/2007 | |
| KR | 10-0876659 B1 | 1/2009 | |
| KR | 10-1094185 B1 | 12/2011 | |
| WO | 9961833 A1 | 12/1999 | |
| WO | 2007017508 A2 | 2/2007 | |

OTHER PUBLICATIONS

European Office Action issued in European Patent Application No. 12875431.4 dated Nov. 15, 2017.
European Office Action issued in European Patent Application No. 12875431.4 dated Jun. 15, 2018.
Extended European Search Report issued in European Patent Application No. 12875431.4 dated Nov. 24, 2015.
International Search Report issued in International Application No. PCT/KR2012/007863 dated Mar. 4, 2013.
U.S. Office Action issued in U.S. Appl. No. 14/396,363 dated Jul. 14, 2017.
U.S. Office Action issued in U.S. Appl. No. 14/396,363 dated Dec. 26, 2017.
U.S. Office Action issued in U.S. Appl. No. 15/727,167 dated May 1, 2018.

* cited by examiner

METHODS FOR MANUFACTURING METAL-RESIN COMPOSITE PIPE THAT CAN BE EASILY WOUND INTO RING SHAPE

RELATED APPLICATIONS

This application is a Continuation patent application of U.S. patent application Ser. No. 15/727,167, filed on Oct. 6, 2017 which is the Divisional patent application of U.S. patent application Ser. No. 14/396,363, filed on Oct. 22, 2014 which is a U.S. National Phase under 35 U.S.C. § 371 of International Application No. PCT/KR2012/007863, filed on Sep. 27, 2012, which in turn claims the benefit of Korean Application No. 10-2012-0042189, filed on Apr. 23, 2012, the disclosures of which are incorporated by reference herein.

TECHNICAL FIELD

The present invention relates to methods for manufacturing a metal-resin composite pipe, and more particularly, to methods for manufacturing the metal resin composite pipe that can be wound in a ring shape without deformation of a circular shape of a cross section of the pipe and may be manufactured with a long length to provide excellent transportability and constructability.

BACKGROUND ART

Generally, a high corrosion resistant metal pipe such as a stainless steel pipe has many advantages, but has a high unit cost of production resulting from use of a high priced material such as stainless steel, and has many difficulties in construction due to forming limitations in bending etc., and can be made straight only.

Also, a metal pipe manufactured in a straight shape has predetermined lengths for delivery, and an operation of connecting the metal pipes in a construction site requires considerable amounts of components, manpower, and time.

Also, when a metal pipe is buried in the ground, the metal pipe is inevitably susceptible to soil corrosion and electric corrosion etc.

Meanwhile, a resin pipe has a high corrosion resistance, a light weight, good constructability, and a low cost, but has a leakage risk due to separation of a connected portion caused by contraction and expansion with temperature changes and is vulnerable to pressure. Meanwhile, when manufacturing a resin pipe, extrusion is performed with an outer diameter of a resin pipe being slightly greater than a desired outer diameter, and the outer diameter is reduced through a sizing process during cooling to meet the density and surface requirements.

DISCLOSURE OF INVENTION

Technical Goals

A metal resin composite pipe includes, as shown in FIGS. 1 and 2, a metal pipe 1 and a resin layer 5 formed on an outer surface of the metal pipe 1. A configuration and a manufacturing method of this metal resin composite pipe 10 is disclosed in Korean Patent No. 10-1094185.

The metal pipe 1 has a direct contact with a fluid flowing therethrough, and is made from a thin plate metal such as, for example, stainless steel, and thus has a high corrosion resistance. The resin layer 5 surrounds the metal pipe 1, and a thickness of the resin layer 5 is even greater than a thickness of the metal pipe 1. The resin layer 5 is made from a resin having a high corrosion resistance and a low cost. Accordingly, the metal resin composite pipe 10 has advantages of a high corrosion resistance to a fluid flowing therethrough, a high corrosion resistance to soils, and a low cost.

The manufacturing method disclosed in Korean Patent No. 10-1094185 manufactures the metal pipe 1 by plastic deformation process using a residual stress and corrects the metal pipe to be close to roundness and then coats the resin on the outer surface of the metal pipe 1. By solving the prior art's problems, the manufacturing method can manufactures the metal resin composite pipe 10 effectively having the thick resin layer 5 coated on the outer surface of the thin plate stainless steel pipe 1.

However, to deliver the metal resin composite pipe 10 to a construction site after manufacturing the metal resin composite pipe 10, the metal resin composite pipe 10 needs to be produced into a straight pipe having a predetermined length for the convenience of delivery, similar to a metal pipe. However, to use a straight pipe in a construction site, connecting the composite pipe 10 is required, and this connection operation involves considerable amounts of components, manpower, and time.

To solve this problem, there was a need for production and supply of the metal resin composite pipe 10 by winding the metal resin composite pipe 10 circularly on a winder.

However, it is almost impossible to manufacture the metal pipe or the metal resin composite pipe 10 by winding in a ring shape due to characteristics of a material. To produce a pipe wound in a ring shape, development of a technique for winding the pipe while maintaining a circular cross section of the pipe is critical. Further, in view of storage and transportation of a product, minimizing the radius of curvature as much as possible while maintaining the circular cross section of the pipe was a problem that has to be solved. However, generally, when a bending force greater than or equal to an elastic limit is applied to the metal pipe to obtain a minimum curvature radius, a result is a deformation of the circular cross sectional shape or a folding of the pipe due to characteristics of steel, which cause a deformation of the pipe.

Accordingly, there is a need to manufacture the metal resin composite pipe 10 with a longer length while improving delivery performance.

Meanwhile, as described in the foregoing, the metal resin composite pipe 10 is manufactured by coating an outer surface of the metal pipe 1 with a resin. The coating is implemented by a coating mold unit.

As shown in FIG. 3, a coating mold unit 20 includes an inner dice 21, an inner die lip 23 disposed at the rear of the inner dice 21, an outer die lip 25 disposed at the rear of the inner die lip 23, and an outer dice 27 surrounding the outer die lip 25.

The metal pipe 1 (not shown in FIG. 3) passes through the inner dice 21, the inner die lip 23, and the outer die lip 25 in a sequential order. An adhesive resin (not shown) is extruded on an outer surface of the metal pipe 1 through an adhesive resin injection hole 24a, and a resin is extruded through a resin injection hole 25a.

Meanwhile, as described in the foregoing, when manufacturing a resin pipe, extrusion is performed with an outer diameter of a resin pipe being slightly greater than a desired outer diameter and the outer diameter is reduced through a sizing process during cooling to meet the density and surface requirements.

However, because the metal resin composite pipe 10 includes the metal pipe 1 embedded therein, the sizing process is infeasible, resulting in a low surface quality of the composite pipe 10.

The present invention is designed to solve the foregoing problems, and an object of the present invention is to provide methods for manufacturing a metal resin composite pipe that may be wound in a ring shape to provide excellent transportability and constructability as well as high economic efficiency, and avoids damaging roundness when winding, and is easy to straighten, and a manufacturing method thereof.

Another object of the present invention is to provide methods for manufacturing a metal resin composite pipe having a high surface quality and a proper density without passing through a sizing process, and a manufacturing method thereof.

Technical Solutions

To achieve the objects of the present invention, a metal resin composite pipe according to the present invention may include a metal pipe, a resin layer formed by coating an outer surface of the metal pipe, and an adhesive layer formed between the metal pipe and the resin layer. The resin layer adhere to the metal pipe by the adhesive layer. To wind the metal resin composite pipe in a ring shape having a minimum curvature radius, a shape deformation problem of the pipe caused by ovality of a circular cross section or folding has to be solved by adjusting a bending force greater than or equal to an elastic limit.

To wind the pipe without deformation of the circular cross section of the pipe against the bending force, rigidity may be reinforced and the radius of curvature in winding in a ring shape may be minimized as much as possible by coating with a synthetic resin having an even lower elastic coefficient than that of the metal pipe. In this instance, a thickness p of the metal pipe may be within a range of 5% to 20% of a thickness q of the resin layer.

When a thickness q of the resin layer is even greater than a thickness p of the metal pipe, that is, when a thickness ratio p/q is very small (p/q is less than 5%), a surface defect such as, for example, corrugation, may occur due to a compressive force being applied to an inner part of the composite pipe when winding, which makes it impossible to minimize the radius of curvature when winding the pipe in ring shape while maintaining the shape of the pipe and to obtain a target radius of curvature due to restoration of the resin layer.

Meanwhile, when the thickness ratio p/q exceeds 20%, that is, when the thickness q of the resin layer is relatively small, the thickness p of the metal pipe may reach a similar level to a thickness of a conventional metal pipe, which results in difficulty in bending. Also, in order to bend the composite pipe without deformation, the radius of curvature may be increased greatly, which may be unfavorable in terms of transportation and storage. Further, in outer part of the composite pipe where a tensile force being applied while winding, plastic deformation of the resin may occur because the tensile force exceeds a yielding point of the resin due to the thickness q of the resin layer is thin, accordingly the resin may lose its unique property.

Through trial and error, it is concluded that when a polymer synthetic resin is used for coating, the coating may reinforce rigidity of a stainless steel pipe, and when a ratio of thickness p of the metal pipe to the thickness q of the resin layer has a particular range, that is, 5% to 20%, a pipe wound in ring shape which is free of a cross sectional deformation may be manufactured.

The resin layer may be formed by extruding the resin on the adhesive layer continuously to coat the metal pipe with the resin. The coating may be performed by extruding the resin under a pressure of 88 $kg/cm^2$ to 96 $kg/cm^2$ while the metal pipe passes through an outer dice having an inner diameter D1 equal to an outer diameter of a composite pipe intended to manufacture or less than the outer diameter of the composite pipe intended to manufacture by 1 mm or less.

According to the present invention, a method of manufacturing a metal resin composite pipe may comprise the steps of (a) preparing a metal pipe, and (b) coating the metal pipe by forming an adhesive layer on an outer surface of the metal pipe and by forming a resin layer by extruding a resin on the adhesive layer. A thickness p of the metal pipe may be within a range of 5% to 20% of a thickness q of the resin layer.

The step (b) may be performed by extruding the adhesive resin and the resin in a sequential order while the metal pipe passes through a coating mold unit. The coating mold unit may include an inner dice, an inner die lip disposed at a rear of the inner dice, an outer die lip disposed at a rear of the inner die lip, and an outer dice surrounding the outer die lip. The metal pipe may be coated while passing through the inner dice, the inner die lip, and the outer die lip in a sequential order. An inner diameter D1 of the outer dice may be equal to an outer diameter of the composite pipe or less than the outer diameter of the composite pipe by 1 mm or less, and the extrusion may be performed by extruding the resin under a pressure of 88 $kg/cm^2$ to 96 $kg/cm^2$ being applied to the resin.

Preferably, an inner diameter D3 at a tip 233 of a slope surface 232 of the inner die lip may be greater than an outer diameter of the metal pipe by 0.1 mm to 0.2 mm.

Further, the manufacturing method may comprise, after the step (b), winding the resulting composite pipe in a ring shape. In this instance, a diameter u of the ring shape may be preferably greater 20 times to 50 times than the outer diameter of the composite pipe.

Effects of Invention

The present invention may have the following effects.

First, the metal resin composite pipe manufactured by the present invention may be wound in a ring shape to provide excellent transportability and constructability as well as high economic efficiency, avoids damaging roundness when winding, and is easy to straighten.

Second, the present invention can manufactures a metal resin composite pipe having a high surface quality and a proper density without undergoing a sizing process during the cooling.

Figure 1:
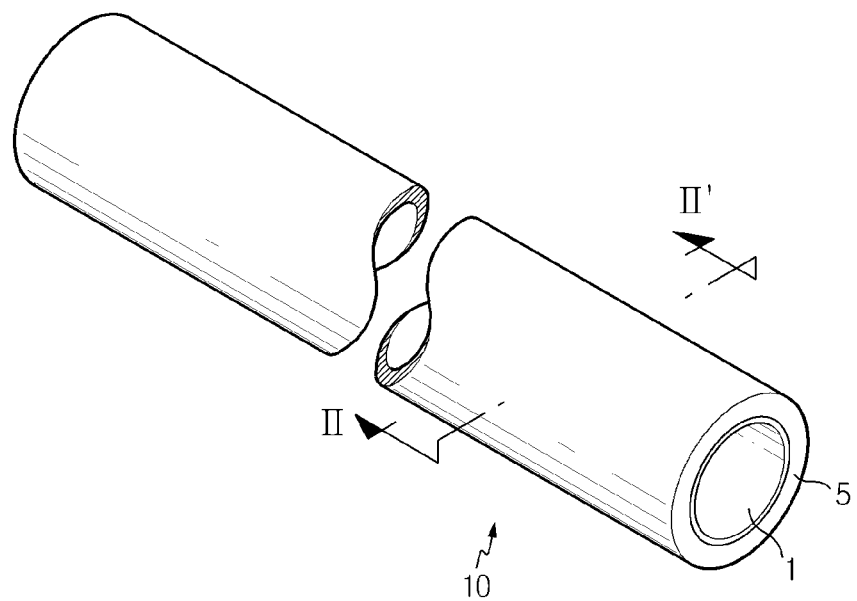
FIG. 1 is a perspective view illustrating a metal resin composite pipe according to the present invention.
Figure 2:
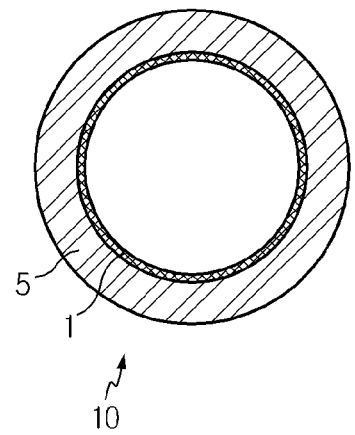
FIG. 2 is a cross sectional view taken along a line II-II' in FIG. 1.
Figure 3:
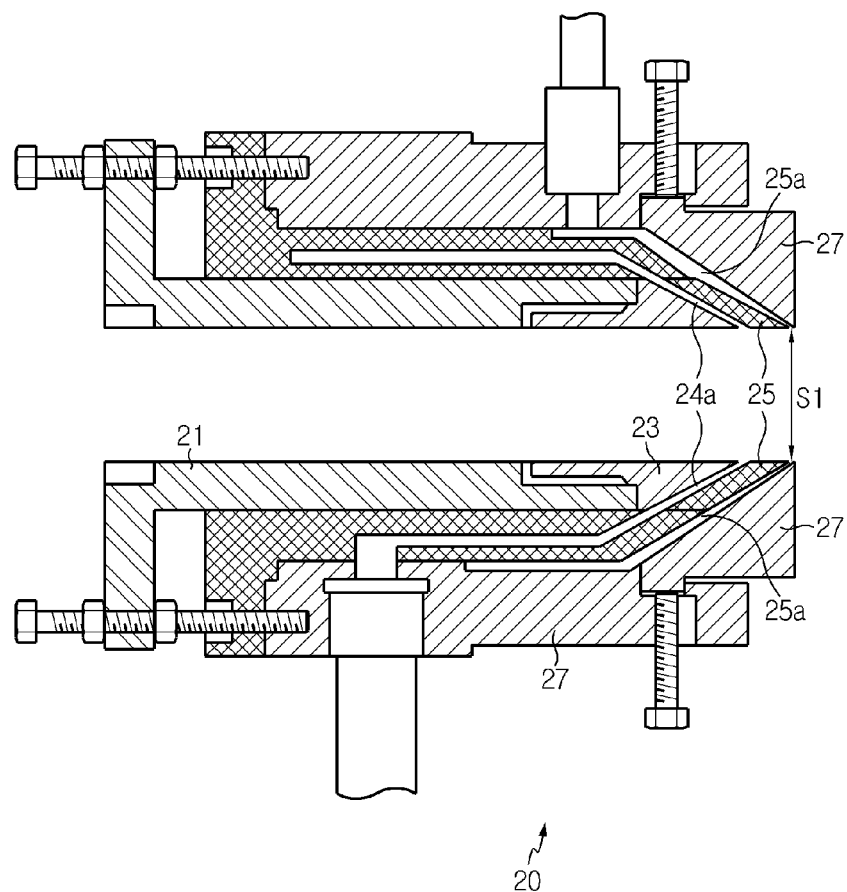
FIG. 3 is a cross sectional view illustrating a coating mold unit used to manufacture the metal resin composite pipe of FIG. 1.

REFERENCE SYMBOLS 1, 30: metal pipe
5, 50: resin layer
40: adhesive layer
10, 100: metal resin composite pipe
20, 200: coating mold unit
21, 210: inner dice
23, 230: inner die lip
25, 250: outer die lip
27, 270: outer dice
24a, 231: adhesive resin injection hole
25a, 251: resin injection hole
120: welding unit
300: correction unit
310: the first correction unit
320: the second correction unit
330: the third correction unit
400: drawing unit
500: preheating unit
700, 700': water-cooling unit
700b: air-cooling unit
D1: inner diameter of the outer dice
p: thickness of the metal pipe
q: thickness of the resin layer

MODE FOR CARRYING OUT THE INVENTION

Hereinafter, embodiments of the present invention are described in detail with reference to the accompanying drawings. Prior to the description, the terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

The present invention relates to methods for manufacturing a metal resin composite pipe, and is characterized in that the composite pipe may be wound in a ring shape, for example, in a shape of a roll, and the composite pipe having excellent density and surface quality may be manufactured without undergoing a sizing process. Accordingly, the following description is provided based on these characteristics. For a detailed description of a configuration of a general metal resin composite pipe and a manufacturing method thereof, reference may be made to Korean Patent No. 10-1094185 etc., the disclosure of which is incorporated herein in the condition of understanding a configuration of a general metal resin composite pipe and a manufacturing method thereof.

Figure 4:
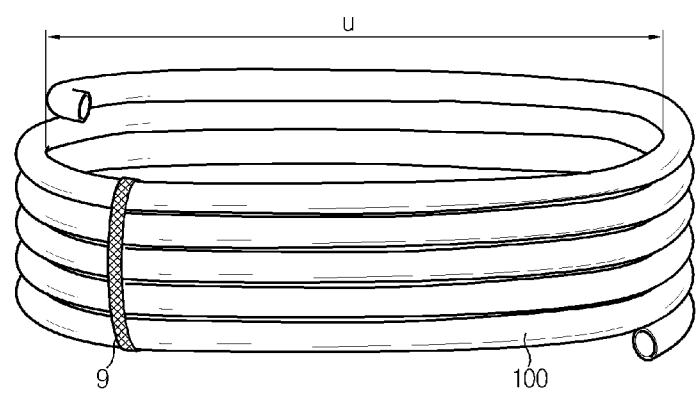
FIG. 4 is a perspective view illustrating a metal resin composite pipe wound in a ring shape manufactured according to a preferred embodiment of the present invention.
Figure 5:
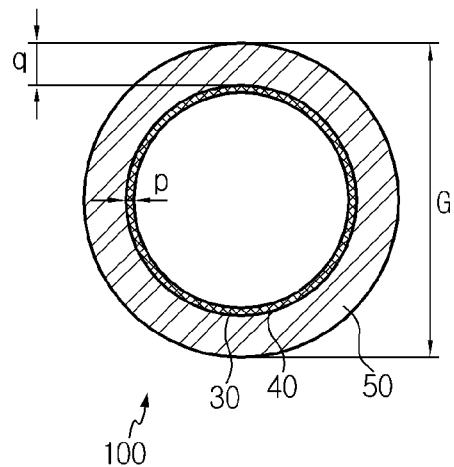
FIG. 5 is a cross sectional view of the metal resin composite pipe of FIG. 4.

FIG. 4 is a perspective view illustrating a metal resin composite pipe wound in a ring shape manufactured according to a preferred embodiment of the present invention. FIG. 5 is a cross sectional view of the metal resin composite pipe.

Referring to FIGS. 4 and 5, the metal resin composite pipe 100 may include a metal pipe 30, an adhesive layer 40 formed on an outer surface of the metal pipe 30, and a resin layer 50.

The metal pipe 30 may have a direct contact with a fluid flowing therethrough. Preferably, the metal pipe 30 may be made from a good corrosion resistant metal such as, for example, stainless steel.

The metal pipe 30 may be formed of a thin plate, and the thin plate may be thinner than the resin layer 50.

The applicant discovered through long-term experience and research that if a thickness ratio p/q of the metal pipe 30 and the resin layer 50 has a certain range, the composite pipe 100 may be easy to wind in a ring shape, for example, in a shape of a roll, and a property change of the metal pipe 30 may be prevented.

Specifically, according to the study of the applicant, in a case in which a thickness p of the metal pipe 30 is within a range of 5% to 20% of a thickness q of the resin layer 50, when the composite pipe 100 is wound in a ring shape, roundness of the cross section of the metal pipe 30 can be maintained and plasticity may be maintained so that a circular shape can be maintained and deformation of the metal pipe 30 can be prevented. In this instance, when the composite pipe 100 is wound in a ring shape, a diameter u of the ring shape may be preferably greater about 20 times to about 50 times than an outer diameter G of the composite pipe 100.

Meanwhile, the term "roundness" used herein refers to a shape of a circle in a mathematical sense or a shape analogous or similar thereto, other than a crushed circle, for example, an oval. A reference numeral 9 is a strip used to fix the wound composite pipe 100 in a ring shape.

When the thickness ratio p/q is less than 5%, plasticity may not be maintained due to elasticity or resilience of the resin layer 50 and consequently, the ring shape, for example, the shape of the roll, may not be maintained. When the thickness ratio p/q exceeds 20%, the resin layer 50 may fail to prevent deformation of the metal pipe 30, circularly winding and straightening may be difficult, properties of the metal pipe 30 may be liable to change, and economic efficiency may be reduced.

The adhesive layer 40 may be made from an adhesive resin and may allow a strong adhesion of the resin layer 50 to the metal pipe 30. The adhesive resin may include a general adhesive resin.

The resin layer 50 may be extruded on the adhesive layer 40 to coat the metal pipe 30. The resin layer 50 may be formed to have a thickness greater than the thickness p of the metal pipe 30. The resin layer 50 may be made from a resin, and the resin may include polyethylene and the like.

The adhesive resin and the resin may be extruded to form the adhesive layer 40 and the resin layer 50 while the metal pipe 30 passes through a coating mold unit.

Then, the manufacturing methods for the metal resin composite pipe 100 is described with referenced to FIGS. 6 to 13.

First, a pipe forming unit (not shown) forms thin plate stainless steel into cylindrical shape with two ends thereof butted (joined) each other by plastic deformation process using residual stress, and then a welding unit 120 welds the two ends to make the metal pipe 30 (S1 step).

The welded part is mostly the upper part of the metal pipe 30, and when the welded part is cooled, shrinkage occurs, causing the metal pipe 30 to bend upward. Accordingly, the method includes the step S2b in which the metal pipe 30 passes through the correction unit 300 to correct the metal pipe 30 to achieve roundness, and correct straightness to maintain horizon.

Figure 9:
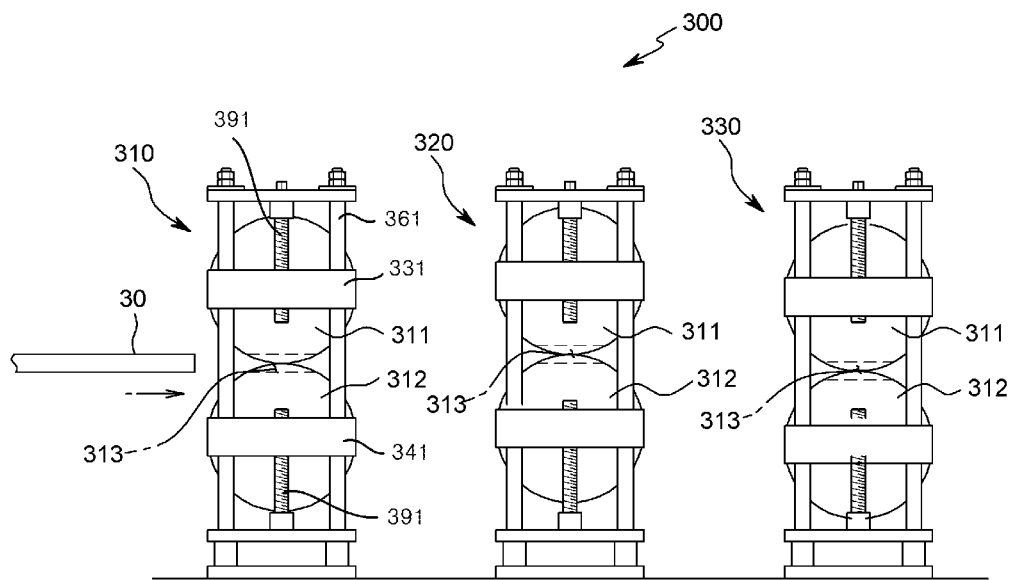
FIG. 9 is a front view of a correction unit provided in the apparatus shown in FIG. 8.
Figure 10:
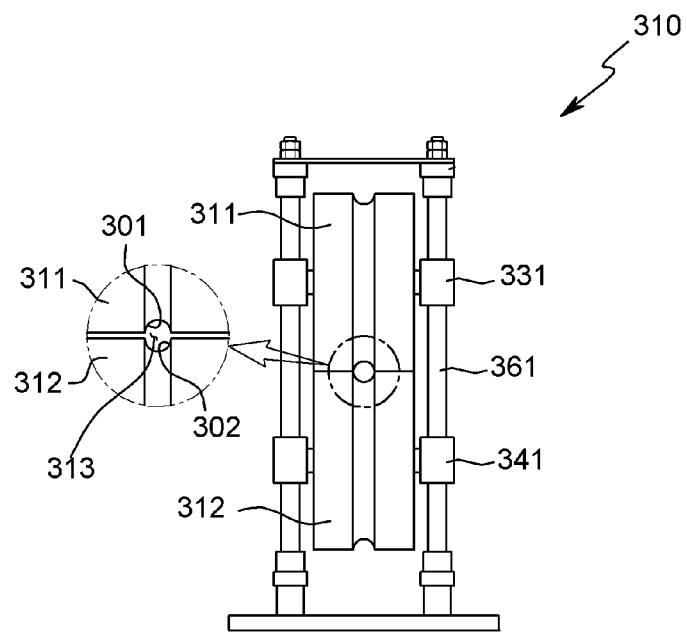
FIG. 10 is a side view of the first correction unit of FIG. 9.

As shown in FIGS. 9~10, the correction unit 300 includes first to third correction units 310, 320, 330. Of course, it is obvious that the number of correction units 300 installed may be increased or reduced when necessary. Since the first to third correction units 310, 320, 330 have the same configuration, only the first correction units 310 is explained below.

The first correction units 310 includes first and second rollers 311, 312 having recess grooves 301, 302 formed on the outer surface thereof, correction groove 313 formed as roundness by recess grooves 301, 302 and, a gap adjustment means to adjust the gap between the first and second rollers 311, 312.

The first to third correction units 310, 320, 330 are sequentially arranged along the moving direction of the metal pipe 30. The correction groove 313 of the second correction unit 320 is set to be disposed at a higher location than the correction groove 313 of the first correction unit 310 so that the metal pipe 30 primarily corrected by the first correction unit 310 to have roundness but upwardly bent is corrected to horizontal state while passing through the correction groove 313 of the second correction unit 320.

The third correction unit 330 is set such that the correction groove 313 thereof is disposed at a location that is level to or slightly lower than the correction groove 313 of the first correction unit 310, so that roundness correction and horizon correction are performed again for the metal pipe 30 having corrected to horizontal state by the correction unit 320, thereby having more accurate roundness and straightness.

Meanwhile, the gap adjustment means adjusts the gap between the first and second rollers 311, 312. As shown in FIGS. 9 and 10, the gap adjustment means includes a plurality of guide rods 361, first and second beds 331, 341 having the first and second rollers 311, 312 mounted thereon respectively and coupled to the guide rods 361, lift rods 391 screw coupled to the first and second beds 331, 341 respectively.

By rotating the lift rods 391 with a tool such as a spanner, the first and second beds 331, 341 are lifted up or down, and then the gap between the second roller 312 and the first roller 311 is adjusted.

The metal pipe 30 corrected by the correction unit 300 is drawn continuously by the drawing unit 400 to move to the next process. Meanwhile, the drawing unit 400 may be also further installed at the rear of the cooling unit to draw the finally cooled metal resin composite pipe.

Figure 8:
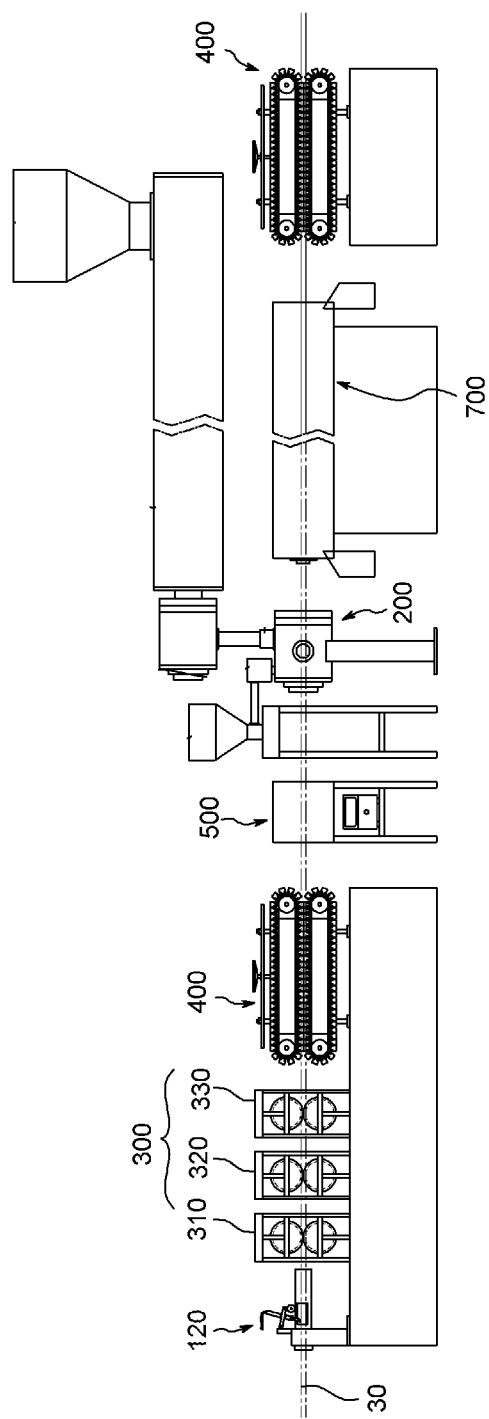
FIG. 8 is a front view showing the apparatus for manufacturing a metal resin composite pipe.

As shown in FIG. 8, the drawing unit 400 includes upper and lower caterpillars and a drive motor (not shown) to drive the upper and lower caterpillars.

The metal pipe 30 having passed the drawing unit 400 is heated by a preheating unit 500 for efficient coating (step S2c). The preheating unit 500 generates heat using a heating coil etc., and has a common configuration.

The preheated metal pipe 30 is coated with synthetic resin by the coating mold unit 200 (S3 step).

Figure 6:
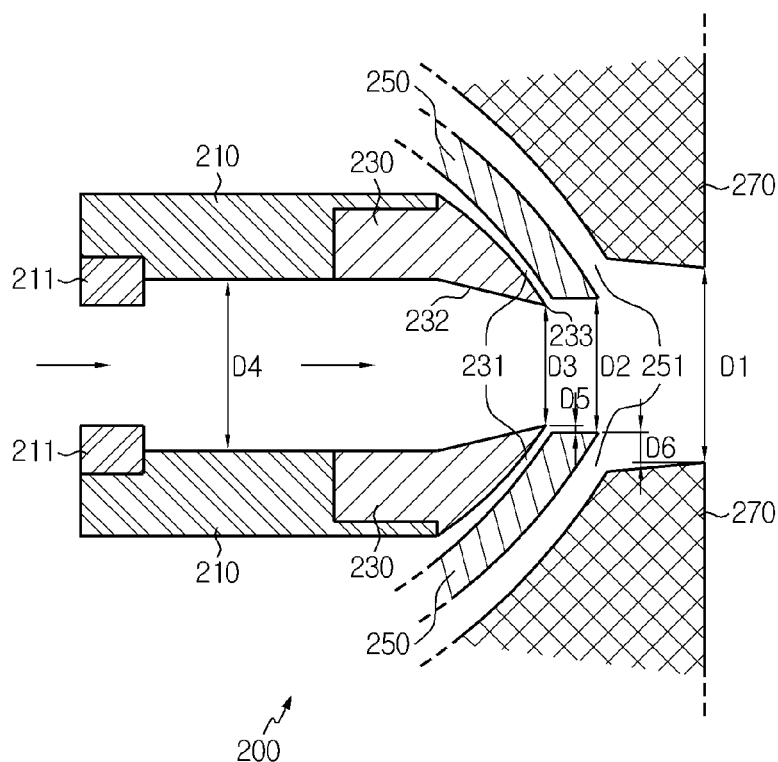
FIG. 6 is a cross sectional view illustrating a main configuration of a coating mold unit used to manufacture the metal resin composite pipe of FIG. 5.
Figure 7:
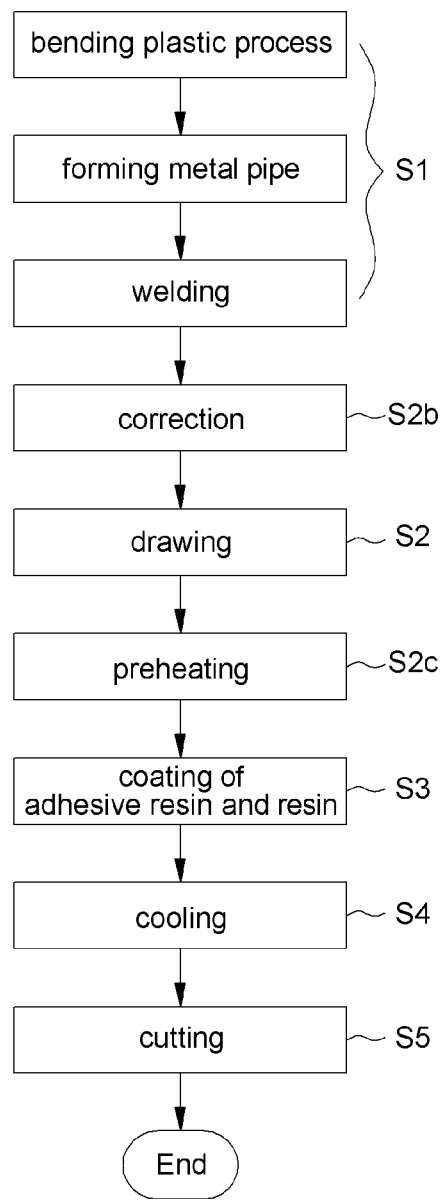
FIG. 7 is a flowchart showing a method for manufacturing a metal resin composite pipe according to the present invention.

As shown in FIG. 6, the coating mold unit 200 may include an inner dice 210, an inner die lip 230 disposed at the rear of the inner dice 210, an outer die lip 250 disposed at the rear of the inner die lip 230, and an outer dice 270 surrounding the outer die lip 250.

The metal pipe 30 (not shown in FIG. 6) may pass through the inner dice 210, the inner die lip 230, and the outer die lip 250 in a sequential order. That is, the metal pipe 30 may move inside the coating mold unit 200 in a direction of an arrow.

An inner diameter D4 of the inner dice 210 may be greater than a maximum possible outer diameter of the metal pipe 30 in the coating mold unit 200.

The inner die lip 230 may include a slope surface 232 formed inside, and an inner diameter D3 at a tip 233 of the slop surface 232 may be greater than an outer diameter of the metal pipe 30 by 0.1 mm to 0.2 mm. The tip 233 may guide the sliding of the metal pipe 30 together with a metal ring 211.

Meanwhile, the inner die lip 230, the outer die lip 250, the outer dice 270, and the metal ring 211 may be detachably installed, and may be properly replaced in consideration of the outer diameter of the metal pipe 30 to guide the sliding of the metal pipe 30 and to allow proper extrusion.

The outer die lip 250 may have an inner diameter D2 greater than an inner diameter D3. An inner diameter difference D2−D3 may allow a space for extrusion of an adhesive resin. The adhesive resin (not shown) may be extruded on the outer surface of the metal pipe 30 through an adhesive resin injection hole 231 formed between the inner die lip 230 and the outer die lip 250.

The outer dice 270 may surround the outer die lip 250, and may have an inner diameter D1 greater than the inner diameter D2. An inner diameter difference D1−D2 may allow a space for extrusion of a resin. The resin (not shown) may be extruded through a resin injection hole 251 formed between the outer die lip 250 and the outer dice 270.

Meanwhile, as described in the foregoing, when manufacturing a resin pipe, extrusion is performed with an outer diameter of a resin pipe being greater than a desired outer diameter by 2 mm to 5 mm, and the outer diameter is reduced through a sizing process during the cooling to meet the density and surface requirements.

However, because the metal resin composite pipe 100 includes the metal pipe 30 embedded therein, the sizing process may be infeasible, resulting in a low surface quality of the composite pipe 100. When the outer diameter of the resin layer 50 is greater than the inner diameter D1 of the outer dice 270, an excessive resin of the resin layer 50 may flow back. When the outer diameter of the resin layer 50 is less than the inner diameter D1 of the outer dice 270, an outer surface of the resin layer 50 may fail to contact an inner surface of the outer dice 270, leading to an improper density of the resin layer 50, and the absence of a surface polishing effect may contribute to a rough surface, resulting in a low surface quality.

To solve these problems, the present invention may set the inner diameter D1 of the outer dice 270 to be equal to an outer diameter G of a resulting composite pipe (a composite pipe intended to manufacture) or to be less than the outer diameter G of the resulting composite pipe (the composite pipe intended to manufacture) by 1.0 mm or less. Also, when extruding, the present invention may apply to the resin a pressure in a range of 88 kg/cm$^2$ to 96 kg/cm$^2$ that is higher by about 10% to about 20% than a pressure of about 80 kg/cm$^2$ used in a general case.

Accordingly, when the resin is extruded under the conditions of the inner diameter D1 of the outer dice 270 equal to the outer diameter of the resulting composite pipe (the composite pipe intended to manufacture) or less than the outer diameter of the resulting composite pipe by 1 mm or less and the increased pressure, the resin may be expanded after the composite pipe is discharged from the outer dice 270 so that the resin layer 50 greater than the inner diameter D1 of the outer dice 270 may be obtained. Also, the resin layer 50 formed through this process may have a proper density and a high surface quality. That is, a product having a quality as good as a product obtained through a sizing process may be obtained without passing through a sizing process.

As described in the foregoing, because the metal pipe 30 passes through the inner dice 210 and the inner die lip 230, a gap between the tip 233 of the slope surface 232 and the metal pipe 30 may be important in ensuring roundness of the resin layer 50 of the resulting composite pipe 100 by forming the resin layer 50 uniformly. When the gap is excessively great, the resin layer 50 may have a non-uniform thickness, and preferably, the inner diameter D3 at the tip 233 may be greater than the outer diameter of the metal pipe 30 by 0.1 mm to 0.2 mm.

Hereinafter, a method of manufacturing the metal resin composite pipe 100 is described. The following description includes an extrusion process only in the manufacturing process of the metal resin composite pipe 100. Certain processes before and after the extrusion process, for example, a metal pipe manufacturing process, a cooling process, and the like, are well known in the art and disclosed in Korean Patent No. 10-1094185 etc.

After the metal pipe 30 is manufactured, the metal pipe 30 may be inserted in the coating mold unit 200. When the metal pipe 30 is inserted in the inner dice 210 and makes a movement, the movement of the metal pipe 30 may be guided by the metal ring 211 and the tip 233. The adhesive resin may be extruded from the adhesive resin injection hole 231 and applied to the outer surface of the metal pipe 30, and subsequently, the resin may be extruded from the resin injection hole 251. In this instance, the resin may be extruded under a pressure of 88 kg/cm$^2$ to 96 kg/cm$^2$ that is higher than a general extrusion pressure of about 80 kg/cm$^2$ by 10% to 20%. Meanwhile, because the inner diameter D1 is equal to an outer diameter of a resulting composite pipe (composite pipe intended to manufacture) or less than the outer diameter of the resulting composite pipe by 1 mm or less, the resin layer 50 may be expanded after the composite pipe is discharged from the outer dice 270 and a composite pipe having a desired outer diameter may be manufactured by the expansion. The composite pipe 100 manufactured through this process may have advantages of a proper density and a good surface quality of the resin layer 50 without passing through a sizing process.

The composite pipe 100 manufactured by the processes explained above is cooled. Although a water-cooling unit is disclosed in FIG. 8, 'an air-cooling' or 'a water-cooling after an air-cooling' or repetitions of 'a water-cooling after an air-cooling' is also preferred (S4).

Figure 11:
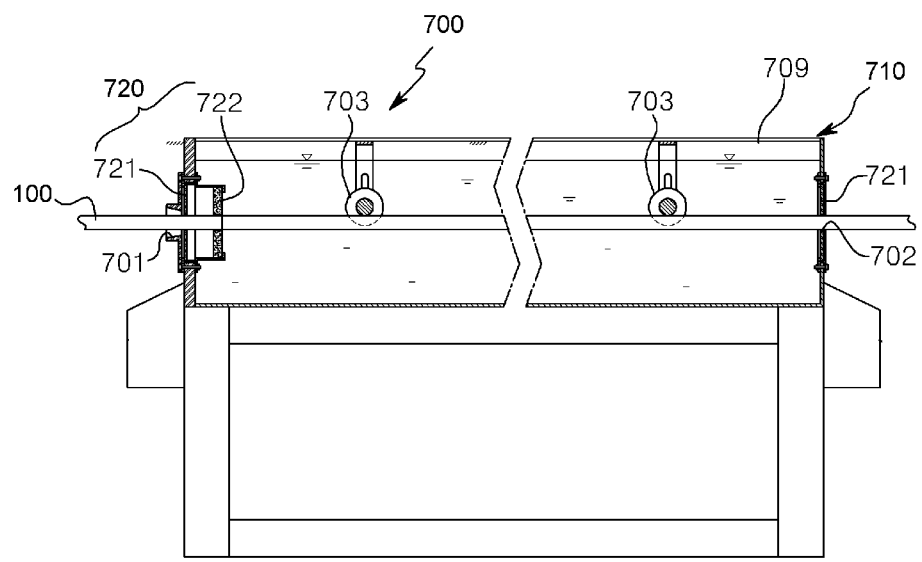
FIG. 11 is a diagram showing an example of a water-cooling unit of the apparatus shown in FIG. 8.

The water-cooling unit 700 immerses the composite pipe 100 in the cooling tank 710 to cool it. As shown in FIG. 11, the water-cooling unit 700 includes the cooling tank 710 having a predefined storage space, an inlet 701 on one sidewall and an outlet 702 on the other sidewall, and in which a transfer roller 703 is mounted on a cover 709 and a cooling water is stored; and a debubbling device 720 formed in the inlet 701.

When the composite pipe 100 is immersed in the water, the composite pipe 100 floats due to the buoyancy, and the transfer roller 703 supports and presses down the composite pipe 100 to prevent floating.

The debubbling device 720 is configured to remove bubbles generated on the outer surface of the composite pipe 100 while introducing the composite pipe 100 into the cooling tank 710, and includes a barrier 721 that is attached to the inlet 701 and has a through-hole through which the composite pipe 100 passes at the center part and has an elastic property, and foam resin 722 that is placed apart from the barrier 721 and has a through-hole through which the composite pipe 100 passes at the center part.

Accordingly, when the composite pipe 100 is introduced into the cooling tank 710 through the through-hole of the barrier 721, bubbles on the outer surface may be cleared off and removed by the foam resin 722.

Preferably, the barrier 721 is heat resistant rubber having heat resistance, and the foam resin 722 is a heat resistant sponge.

Figure 12:
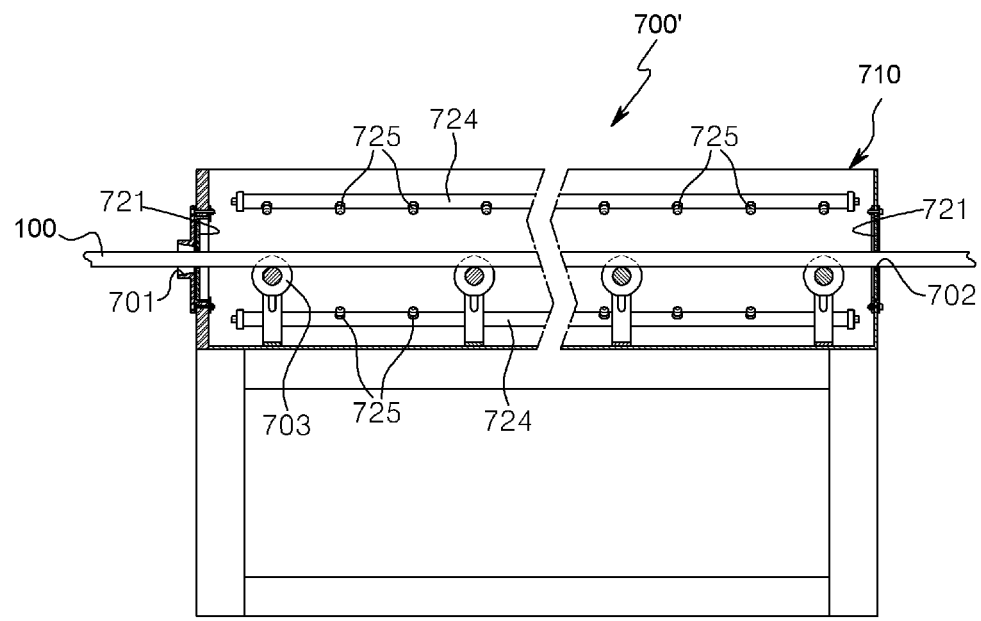
FIG. 12 is a diagram showing another example of a water-cooling unit of the apparatus.

Meanwhile, as shown in FIG. 12, another embodiment of the water-cooling unit 700' uses a showering process in which cooling is performed by spraying water.

That is, water-cooling unit 700' includes a cooling tank 710 having an inlet 701 on one sidewall, an outlet 702 on the other sidewall, and a transfer roller 703 mounted therein; and a coolant pipe 724 installed in the cooling tank 710 and having a plurality of water supply nozzles 725.

A barrier 721 is attached to the inlet 701 and the outlet 702. Accordingly, the composite pipe 100 introduced into the cooling tank 710 may be cooled by showering of water from the water supply nozzles 725 placed on upper, lower, left and right sides around it while it is moving along the transfer roller 703.

Figure 13:
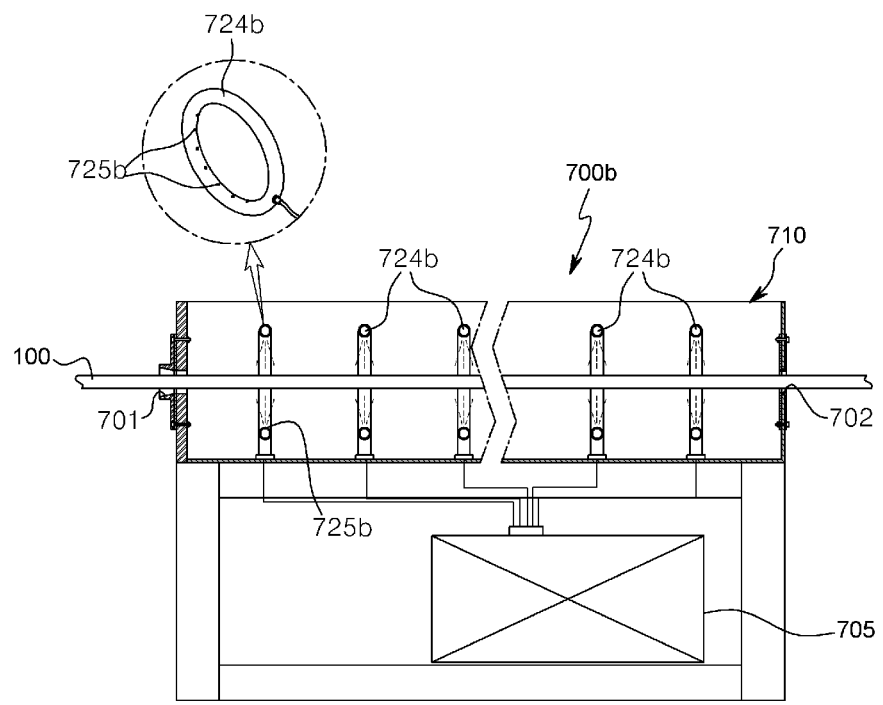
FIG. 13 is a diagram showing an air-cooling unit of the apparatus.

The air-cooling unit performs cooling by spraying air of room temperature or low temperature to the composite pipe 100. As shown in FIG. 13, the air-cooling unit 700b includes a cooling tank 710 in which the composite pipe 100 is received, a plurality of air supply pipes 724b installed in the cooling tank 710 and having a plurality of air jet holes 725b on the inner circumferential surface, and a compressor 705 which supplies air to the air supply pipe 724b.

The air supply pipe 724b is in the shape of a ring with a through-hole formed therein, and the composite pipe 100 may pass through the through-hole.

Of course, it is noted that the air supply pipe 724b is not necessarily limited to a ring shape, and various modifications may be made if the shape has a through-hole through which the composite pipe 100 passes.

While the composite pipe 100 passes through the air supply pipe 724b, a spray of air having high pressure generated from the compressor 705 is blown from the air jet holes 725b to cool the composite pipe 100.

After passing through the cooling process, the composite pipe 100 is cut to a predetermined length by a cutter to manufacture a finished product.

The invention claimed is:
1. A method of manufacturing a metal resin composite pipe, the method comprising steps of:
  (a) manufacturing a metal pipe;
  (b) heating the metal pipe after the step (a);

(c) after the step (b), forming an adhesive layer on an outer surface of the metal pipe, and forming a resin layer by extruding a polyethylene on the adhesive layer; and (d) after the step (c), cooling the resin-coated metal pipe by air-cooling and water-cooling, wherein, in the step (a), a plate stainless steel is formed into cylindrical shape with two ends thereof butted each other by plastic bending deformation process using residual stress, and then the two ends are welded to make the metal pipe, wherein a thickness of a resin layer of the resin-coated metal pipe is thicker than a thickness of the metal pipe, wherein the resin-coated metal pipe has only three layers, and the three layers consist of the metal pipe, the adhesive layer and, the resin layer, wherein the air-cooling is performed before the water-cooling, and a combination of the air-cooling and the water-cooling is performed at least one time, wherein the air-cooling is performed by blowing air to the resin-coated metal pipe, wherein the welding is performed on an upper part of the metal pipe, and the metal pipe is corrected by a correction unit between the step (a) and the step (b), wherein the correction unit comprises a first correction unit, a second correction unit placed after the first correction unit, and a third correction unit placed after the second correction unit, and the first to third correction units each have a correction groove through which the metal pipe passes, wherein the correction groove of the second correction unit is set to a higher location than the correction groove of the first correction unit, and the third correction unit is set such that the correction groove of the third correction unit is disposed at a location that is a level to or lower than the correction groove of the first correction unit.

2. The method of claim 1, wherein the air-cooling is performed by an air-cooling unit, and the air-cooling unit comprises a cooling tank through which the resin-coated metal pipe passes, a plurality of air supply pipes installed in the cooling tank and which has a plurality of air jet holes, and a compressor which supplies compressed air to the air supply pipes.

3. The method of claim 2, wherein the water-cooling is performed by moving the resin-coated metal pipe while immersed in cooling water or by spraying the cooling water to the resin-coated metal pipe.

4. The method of claim 3, wherein the water-cooling is performed by an water-cooling unit which sprays the cooling water, and the water-cooling unit comprises an cooling tank having an inlet on one sidewall and an outlet on the other sidewall, transfer rollers mounted in the cooling tank, and coolant pipes having a plurality of water supply nozzles which sprays the cooling water to the resin-coated metal pipe.

5. The method of claim 2, wherein the air supply pipes have a ring shape, the air supply pipes are installed at a predetermined interval, and the air jet holes are formed on an inner circumferential surface of the air supply pipes, wherein the air jet holes spray air to the resin-coated metal pipe while the resin-coated metal pipe passes through the air supply pipes.

6. The method of claim 1, wherein the thickness of the metal pipe is within a range of 5% to 20% of the thickness of the resin layer.

7. The method of claim 6, wherein the resin-coated metal pipe is manufactured as a straight pipe in the step (d), the resin-coated metal pipe is wound in a ring shape without deformation to a circular cross section of the metal pipe and the resin-coated metal pipe after the step (d), and the resin-coated metal pipe has a property of going back to a straight pipe without deformation to the circular cross section of the metal pipe and the resin-coated metal pipe after the winding.

8. The method of claim 7,
wherein a diameter of the ring shape is 20 times to 50 times greater than an outer diameter of the resin-coated metal pipe.

9. The method of claim 7, wherein the step (c) is performed by extruding an adhesive resin of the adhesive layer and the resin in a sequential order while the metal pipe passes through a coating mold unit, the coating mold unit comprises an inner dice, an inner die lip disposed at a rear of the inner dice, an outer die lip disposed at a rear of the inner die lip, and an outer dice surrounding the outer die lip, the metal pipe is coated while passing through the inner dice, the inner die lip, and the outer die lip in a sequential order, an inner diameter of the outer dice is equal to an outer diameter of the resin-coated metal pipe or less than the outer diameter of the resin-coated metal pipe by 1 mm or less, and the extrusion is performed by extruding polyethylene resin under a pressure of 88 kg/cm2 to 96 kg/cm2 being applied to the polyethylene resin.

10. The method of claim 9, wherein the inner die lip includes a slope surface formed inside the inner die lip, the slope surface extends to a tip of the inner die lip, and the tip is pointed, wherein the tip and a metal ring installed in the inner dice guide sliding of the metal pipe together.

11. The method of claim 10, wherein an inner diameter at the tip is greater than an outer diameter of the metal pipe by 0.1 mm to 0.2 mm.

* * * * *